(12) United States Patent
Wakui

(10) Patent No.: US 6,742,373 B2
(45) Date of Patent: Jun. 1, 2004

(54) METHOD FOR MANUFACTURING A V-BLOCK OF A METAL BELT TYPE CONTINUOUSLY VARIABLE TRANSMISSION

(75) Inventor: Hiroshi Wakui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/926,405

(22) PCT Filed: Apr. 10, 2001

(86) PCT No.: PCT/JP01/03063

§ 371 (c)(1),
(2), (4) Date: Oct. 31, 2001

(87) PCT Pub. No.: WO01/78919

PCT Pub. Date: Oct. 25, 2001

(65) Prior Publication Data

US 2002/0138986 A1 Oct. 3, 2002

(30) Foreign Application Priority Data

Apr. 17, 2000 (JP) ......................................... 2000-115729

(51) Int. Cl.⁷ ........................... B21D 28/00; B21D 53/14
(52) U.S. Cl. ............................. 72/327; 72/412; 72/331
(58) Field of Search ......................... 72/327, 339, 330, 72/331, 337, 412

(56) References Cited

U.S. PATENT DOCUMENTS

| 4,320,647 A | * | 3/1982 | Kummeling et al. | ......... 72/334 |
| 6,427,512 B2 | * | 8/2002 | Suzuki et al. | ................. 72/337 |
| 6,453,716 B2 | * | 9/2002 | Suzuki | ......................... 72/329 |

FOREIGN PATENT DOCUMENTS

| EP | 0 278 545 | * | 8/1988 |
| JP | 63-115638 | * | 5/1988 |
| JP | 63-277703 | | 11/1988 |
| JP | 02-225840 | | 7/1990 |
| JP | 8-10882 | | 1/1996 |
| JP | 2001-21007 | | 1/2001 |

* cited by examiner

*Primary Examiner*—Daniel C. Crane
(74) *Attorney, Agent, or Firm*—Arent Fox PLLC

(57) ABSTRACT

A method for manufacturing a V-block of a metal belt type continuously variable transmission is provided. The V-block is formed by punching a V-block press material with a main punch and a counter punch. The V-block press material has a sectional view including an outer portion of about uniform width and a tapered inner portion with a slant gently inclined toward an innermost end of the material from a place distant from a rocking edge by a predetermined distance inward. The main punch and the counter punch have front shapes of the substantially same as that of the V-block, and either punch facing the rocking edge has a slant starting at a place corresponding to the rocking edge and extending inward rising gradually.

2 Claims, 16 Drawing Sheets

| | | MOMENT OF INERTIA OF AREA I | TENSILE LENGTH $L_T$ | COMPRESSIVE LENGTH $L_C$ | TENSILE | | COMPRESSIVE | |
|---|---|---|---|---|---|---|---|---|
| | | | | | STRESS AT OUTER END $\sigma_T$ | STRESS RATIO | STRESS AT INNER END $\sigma_C$ | STRESS RATIO |
| EMBODIMENT | TAPERED | 15.98119 | 2.522 | 2.725 | M/40.30 | 90.71 | M/43.55 | 97.12 |
| CUSTOMARY | WITH STEP | 14.92902 | 2.449 | 2.833 | M/36.56 | 100 | M/42.29 | 100 |
| | | (mm⁴) | (mm) | (mm) | (mm) $\sigma = M/(I \times L)$ | (%) | | (%) |

FIG.19

| | | PRESS-CRUSH SECTIONAL AREA A | PRESS-CRUSH LENGTH L | MEAN CRUSH DEPTH | MEAN CRUSH DEPTH RATIO |
|---|---|---|---|---|---|
| EMBODIMENT | TAPERED | 0.112295 | 3.218 | 0.0349 | 80.50 |
| CUSTOMARY | WITH STEP | 0.085220 | 1.966 | 0.0433 | 100 |
| | | (mm²) | (mm) | (mm) A/L | (%) |

# METHOD FOR MANUFACTURING A V-BLOCK OF A METAL BELT TYPE CONTINUOUSLY VARIABLE TRANSMISSION

TECHNICAL FIELD

The present invention relates to a manufacturing method of a V-block for a metal belt type continuously variable transmission in which press forming is easy and durability of press die is high.

BACKGROUND ART

There has been known a metal belt type continuously variable transmission having an endless metal belt comprising a thin metal ring assembly formed by thin metal rings piled on each other stratified and many V-blocks supported by the thin metal ring assembly along its circumference. The endless metal belt is wound round a drive pulley and a driven pulley and speed change ratio is controlled by changing widths of grooves of the pulleys. The V-block has a shape as shown in FIGS. 14, 15 (FIGS. 2a, 2b of Japanese Laid-Open Patent Publication Hei 2-225840). Hitherto, the V-block was manufactured in the manner as follows. A plate material of an uniform thickness is punched in a front shape of the V-block to obtain the V-block, and at that time, while thickness of an outer portion of the V-block is left at the uniform thickness, an inner portion of the V-block is press-crushed so that the thickness is reduced gradually toward the innermost portion from a rocking edge.

In order to reduce volume to be press-crushed, as shown in FIGS. 16, 17, the inner portion of the V-block is formed thin stepwise in advance, then a slant surface extending from the rocking edge toward the inner portion is formed by a counter punch.

If a V-block as shown in FIGS. 14, 15 is manufactured without changing thickness of the plate material partly, since mean depth of the press-crushing at the inner portion of the V-block is large, abrasion of a die is severe to shorten the life of the die and result in high cost.

In the V-block shown in FIGS. 16, 17 having the center of gravity positioned outside of the rocking edge, since a large deformation is given only a portion between the step portion and the rocking edge, press-crushed volume is small. However, the inner portion to be subjected to a strong compressive force by a surface of a V-groove of the pulley is thin so that strength and rigidity of the inner portion is insufficient, side surface of the inner portion contacted with the V-groove of the pulley is deformed to be worn severely, loads allotted to the V-block and the metal ring become unequal by deformation of the saddle surface, and lowering of durability of the metal belt and power transmitting efficiency is inevitable.

Further, in the prior art shown in FIGS. 16, 17, since depth of the press-crushing becomes deeper from an outer side toward an inner side unilaterally, press reaction force of a main punch and a counter punch acts in an outer direction, gaps between the die and the main punch and between the die and the counter punch become not constant to be widened partly, shape accuracy of the V-block is lowered, or a broken surface which is not a shear surface is produced at a portion.

DISCLOSURE OF INVENTION

In order to overcome the above-mentioned difficulties, the present invention provides a method for manufacturing a V-block of a metal belt type continuously variable transmission having an endless metal belt comprising a thin metal ring assembly formed by thin metal rings piled on each other stratified and many V-blocks supported by the thin metal ring assembly along its circumference, and wound round a drive pulley and a driven pulley for controlling speed change ratio by changing widths of grooves of the pulleys, wherein the V-block is formed by punching a V-belt press material with a main punch and a counter punch; the V-block press material has a section including an outer portion of about uniform width and a tapered inner portion having a slant gently inclined toward an innermost end of the material from a place distant from a rocking edge by a predetermined distance inward; the main punch and the counter punch have front shapes of the substantially same as that of the V-block; and either punch facing the rocking edge has a slant starting at a place corresponding to the rocking edge and extending inward rising gradually.

According to this invention, the press-crushed part of the V-block press material is thickest at the beginning point of the taper of the V-block press material and becomes gradually thinner from the beginning point toward the rocking edge, as well as similarly becoming gradually thinner from the beginning point inward. Therefore, mean crushing depth of the press-crushed part of the V-block press material becomes smaller than that of the customary method in which the crushed part becomes gradually thicker from the rocking edge inward. As the result, local surface pressure of the counter punch on press forming can be made low to greatly prolong the life of the press die.

Further, according to the invention, since thickness of the inner portion of the V-block does not reduced remarkably compared with thickness of the outer portion, strength and rigidity of the inner portion, which is subjected to strong compressive load by the V-groove of the pulley, is not lowered so largely, so that abrasion of a part of the V-block contacted with the pulley is small, loads allotted to the V-block and the metal ring hardly become unequal by deformation of the saddle surface, and durability of the metal belt and power transmitting efficiency are improved.

If press-crush volume at a portion between the beginning point of the taper and the rocking edge of the V-block press material and press-crush volume at a region inside of the beginning point of the taper of the V-block press material are substantially equal, almost no press reaction force accompanying press forming acts on the punch, relative position of the punch with respect to the die can be maintained exactly, accuracy of shape and size can be improved greatly and no broken surface is produced.

According to another aspect of the present invention, there is provided a die for manufacturing a V-block of a metal belt type continuously variable transmission, wherein the die has a front shape of the substantially same as that of the V-block; the die comprises a main punch and a counter punch having parallel surfaces for pinching a V-block press material having a sectional view including an outer portion of about uniform width and a tapered inner portion having a slant gently inclined toward an innermost end of the material from a place distant from a rocking edge by a predetermined distant inward; and either punch of the main and counter punches facing the rocking edge has a slant starting at a place corresponding to the rocking edge and extending inward rising gradually.

BRIEF DESCRIPTION OF DRAWINGS

FIG. 18 is a table showing bending strengths of a V-block according to the present invention and a customary V-block; and FIG. 19 is a table showing press-crush sectional area A and mean crush depth A/L of a V-block according to the present invention and a customary V-block.

BEST MODE FOR CARRYING OUT THE INVENTION

Hereinafter, an embodiment of the present invention shown in FIGS. 1 to 7 and FIGS. 10 to 13 will be described.

Figure 2:
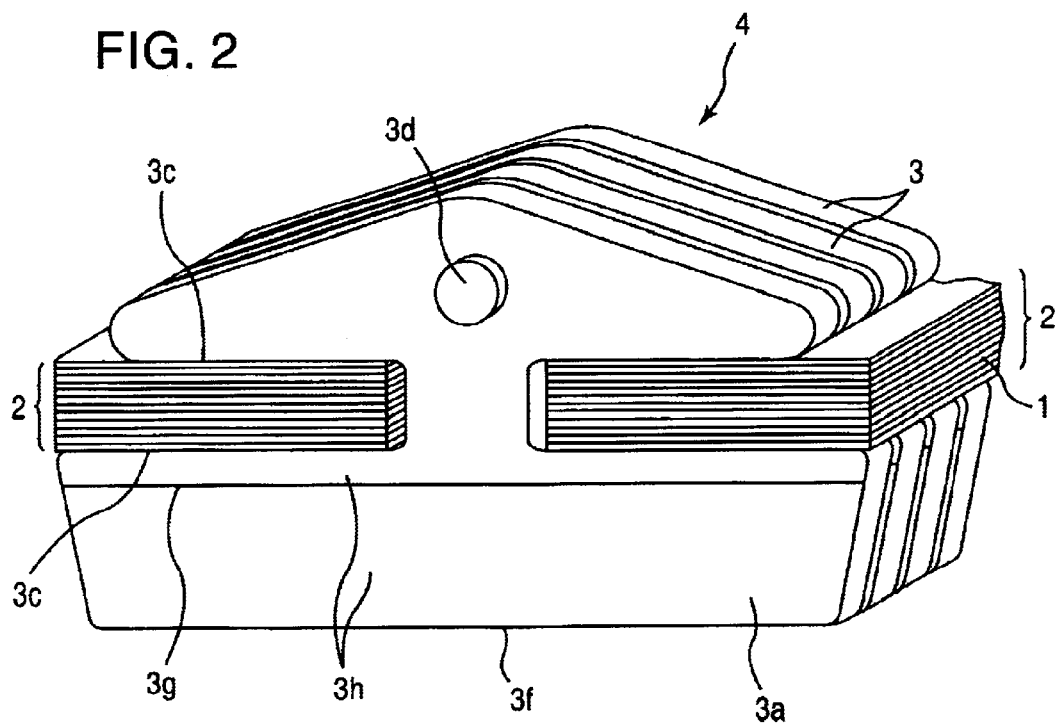
FIG. 2 is a partial perspective view of the endless metal belt.

A thin metal ring 1 of a metal belt type continuously variable transmission 0 has a circumference of 660 mm, a width of 9.2 mm and a thickness of 0.18 mm, for example. As shown in FIG. 2, twelve sheets of thin metal rings 1 are piled in direction of thickness closely to form a thin metal ring assembly 2. Many metal V-blocks 3 are supported by a pair of the thin metal ring assemblies 2 to constitute an endless metal belt.

Figure 1:
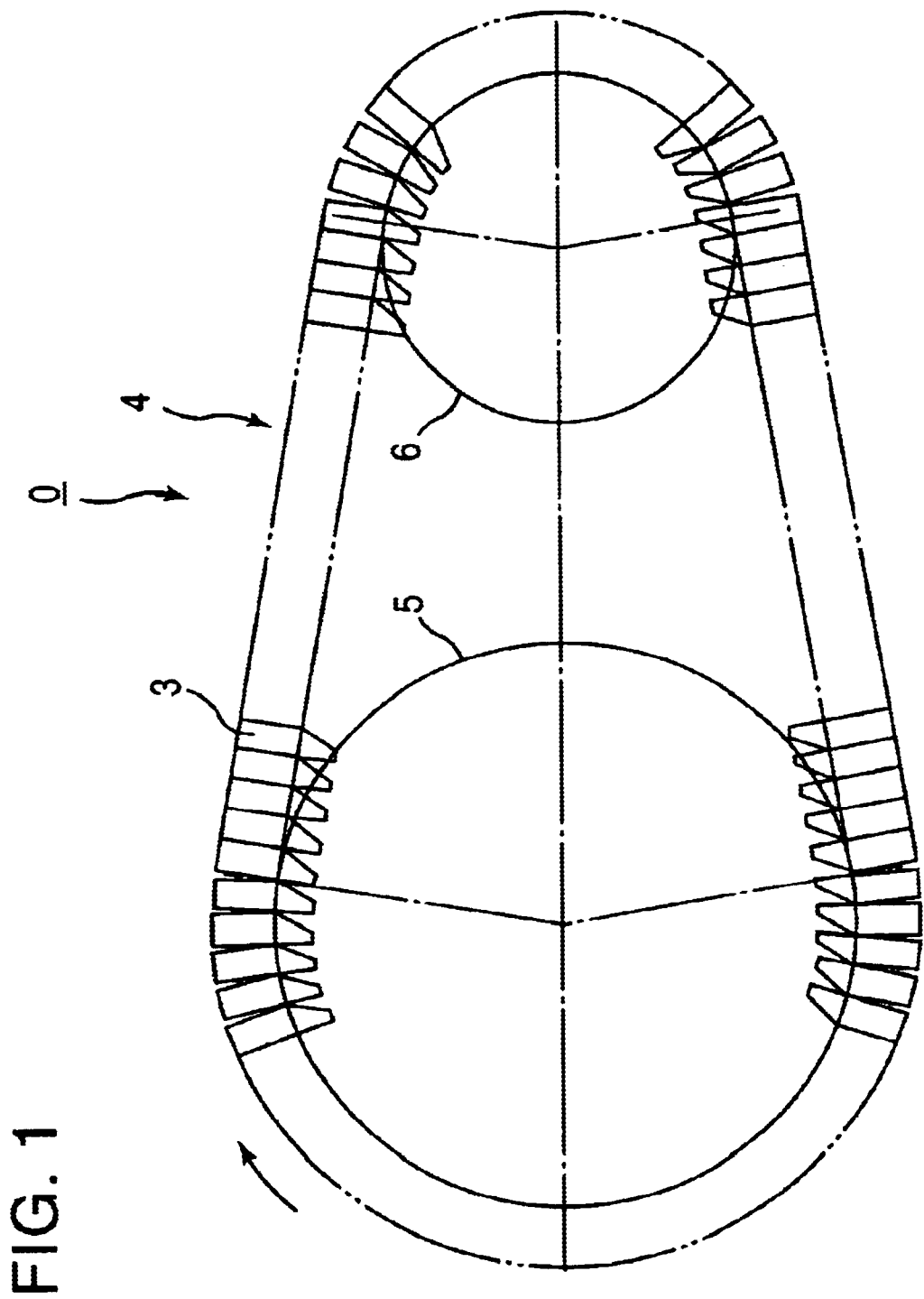
FIG. 1 is a schematic side view of a metal belt type continuously variable transmission with V-blocks manufactured by the method of the present invention.

As shown in FIG. 1, the endless metal belt 4 is wound round a drive pulley 5 and a driven pulley 6 of the metal belt type continuously variable transmission 0. The drive pulley 5 is connected with an internal combustion engine (not shown) through a starting clutch (not shown), and the driven pulley 6 is connected with right and left wheels (not shown) through a gear transmission and a differential gear (not shown) for transmitting power of the internal combustion engine to the wheels.

The drive pulley 5 and the driven pulley 6 have respective oil chambers (not shown). The oil chambers are added with suitably adjusted oil pressure respectively, so that widths of pulley grooves of the drive pulley 5 and the driven pulley 6 is adjusted to give the metal belt type continuously variable transmission an optimum speed ratio.

Figure 3:
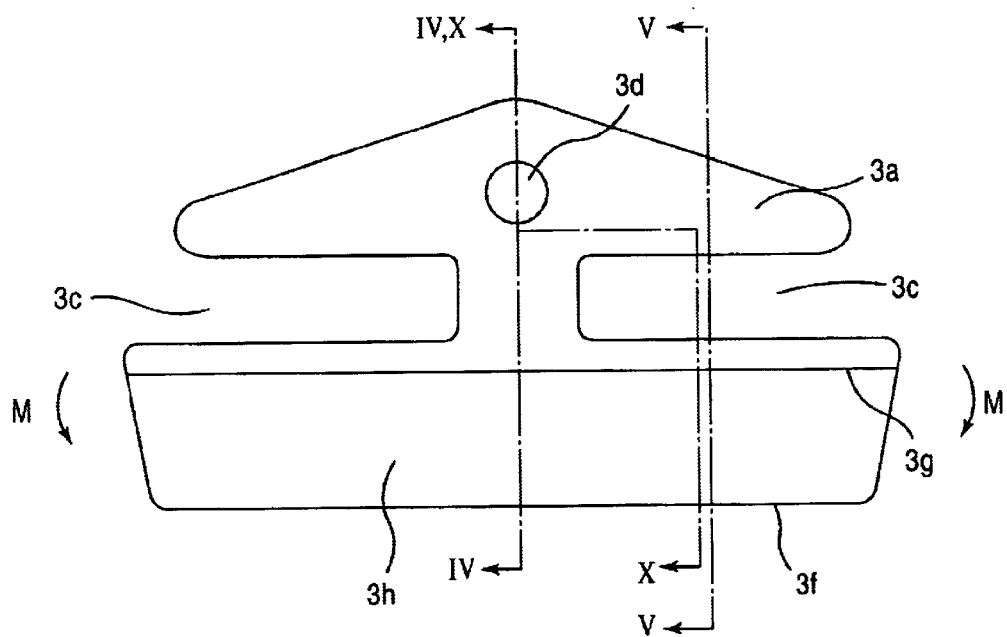
FIG. 3 is a front view of the V-block.
Figure 4:
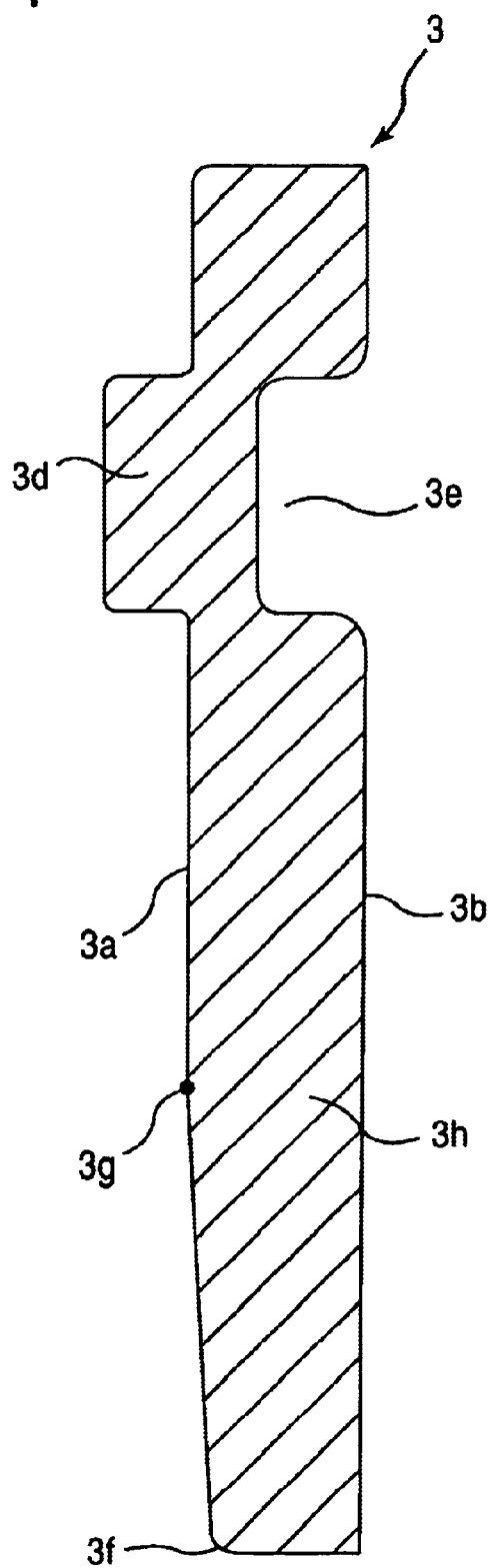
FIG. 4 is a sectional view taken along the line IV—IV of FIG. 3.
Figure 5:
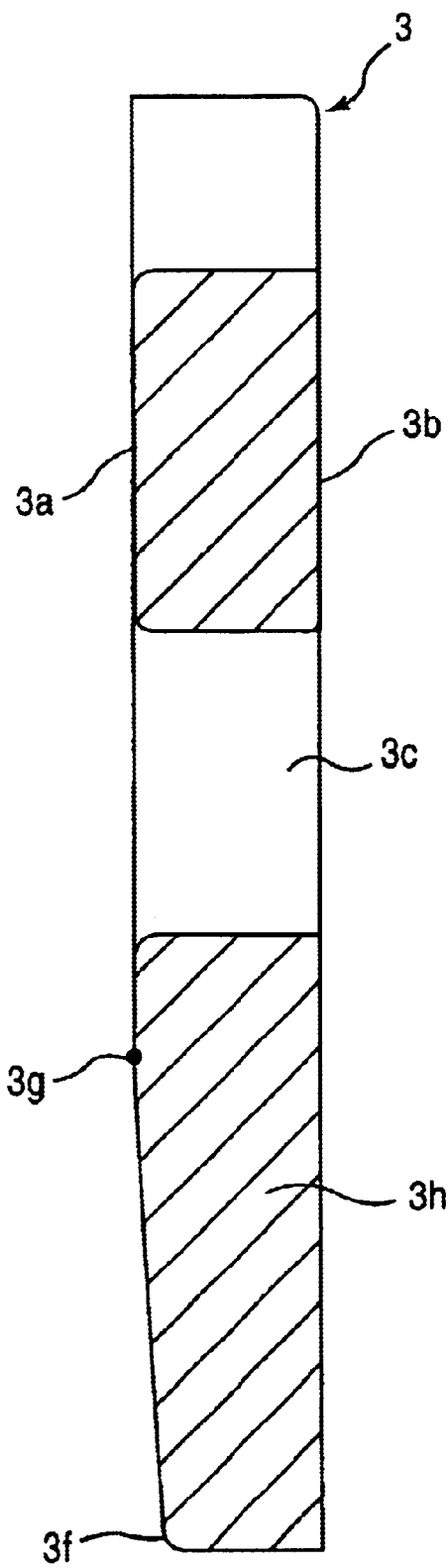
FIG. 5 is a sectional view taken along the line V—V of FIG. 3.
Figure 6:
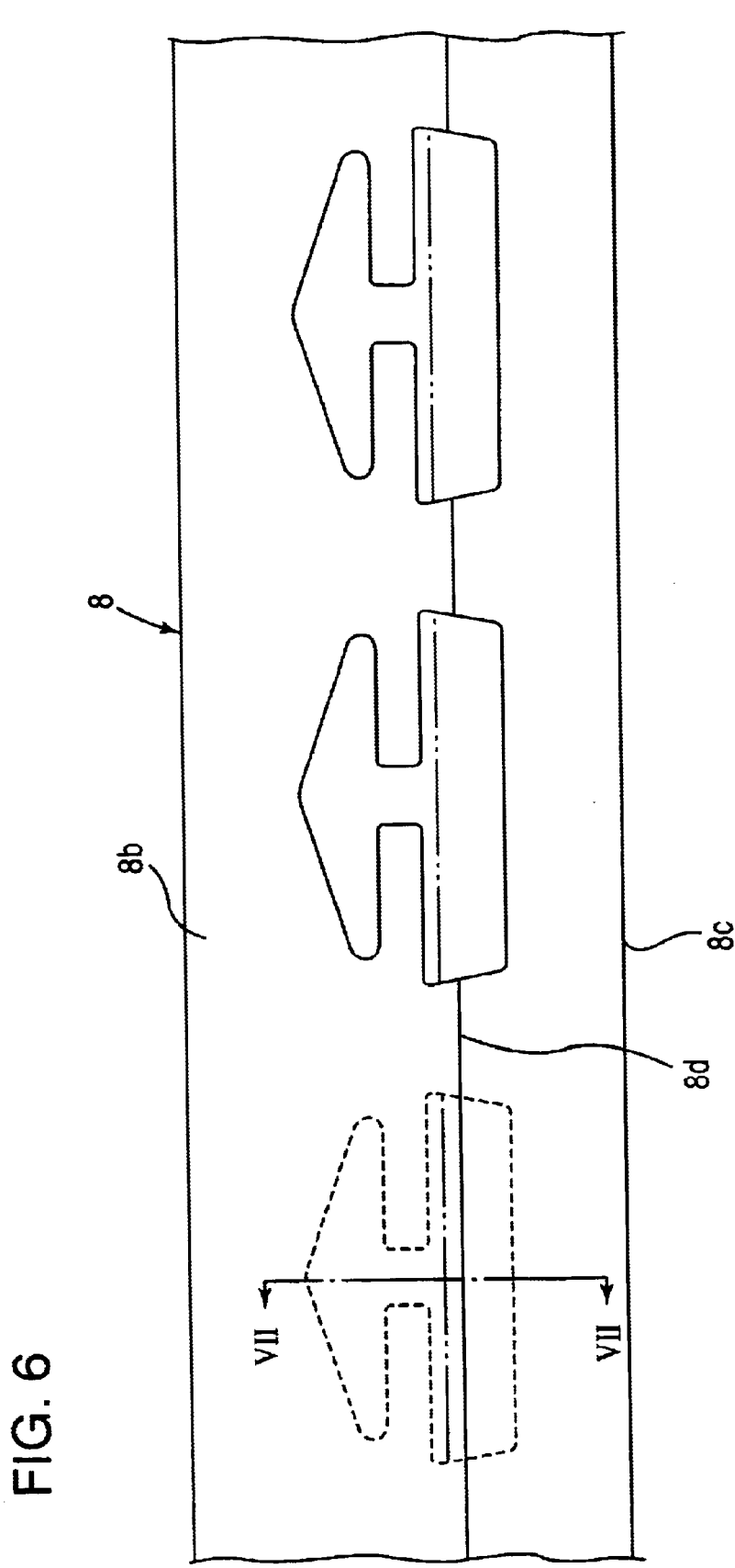
FIG. 6 is a partial plan view of a V-block material.

The metal V-block has a width of 24 mm, a height of 13 mm and a thickness of 1.5 mm. As shown in FIG. 3, in a projected front view of the metal V-block 3, an outer portion is shaped like an umbrella and right and left cuts 3c is formed at an intermediate portion. As shown in FIG. 4, a front surface of the metal V-block 3 with respect to its advancing direction is provided with a short columnar projection 3d at an outer portion, and a rear surface of the metal V-block 3 is provided with a hollow 3e corresponding to the short columnar projection 3d at an outer portion. The rear surface 3b of the metal V-block 3 and the outer portion of the front surface 3a of the metal V-block 3 are flat and parallel with each other. However, inner portion of the front surface 3a of the metal V-block 3 is inclined so that the metal V-block 3 becomes thinner gradually toward an inner edge 3f of the metal V-block 3 from a rocking edge 3g which is positioned at a place distant from the inner edge 3f by 4.2 mm.

Figure 7:
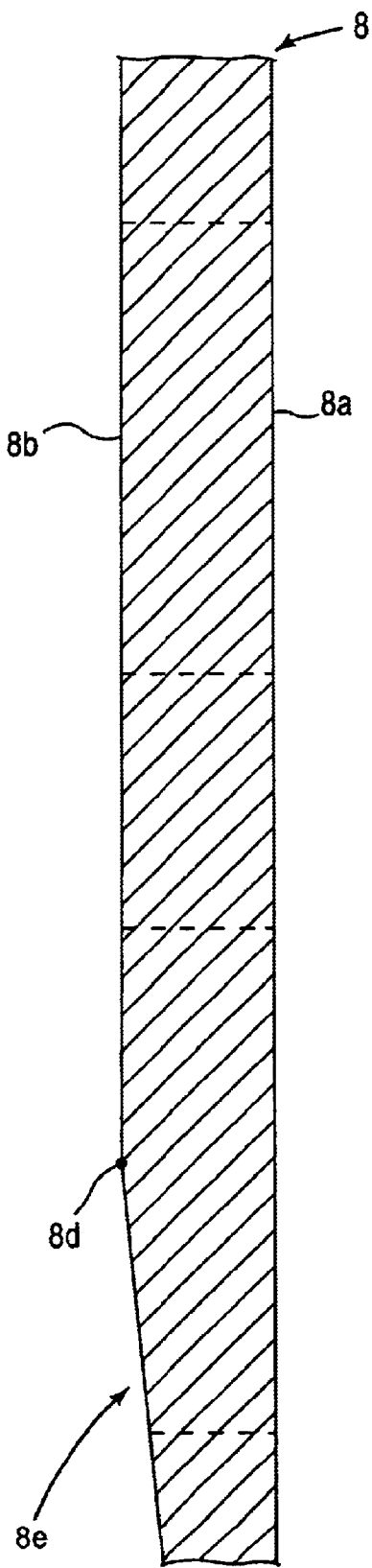
FIG. 7 is a sectional view taken along the line VII—VII of FIG. 6.

In order to manufacture the above-mentioned metal V-block 3, a V-block material 8 as shown in FIG. 7 is formed in advance.

The V-block material 8 is formed from a long belt-like material having a constant thickness of 5 mm and a constant width of about 40 mm that is larger than the height of the metal V-block 3 (13 mm) for facilitating to hold the belt-like material. A surface 8b of the belt-like material 8 is obliquely shaved from an edge line 3d distant from a side edge 3c of the belt-like material by about 17 mm, toward the side edge 3c, so as to form a slant 8e having inclination angle of about 6°.

Figure 10:
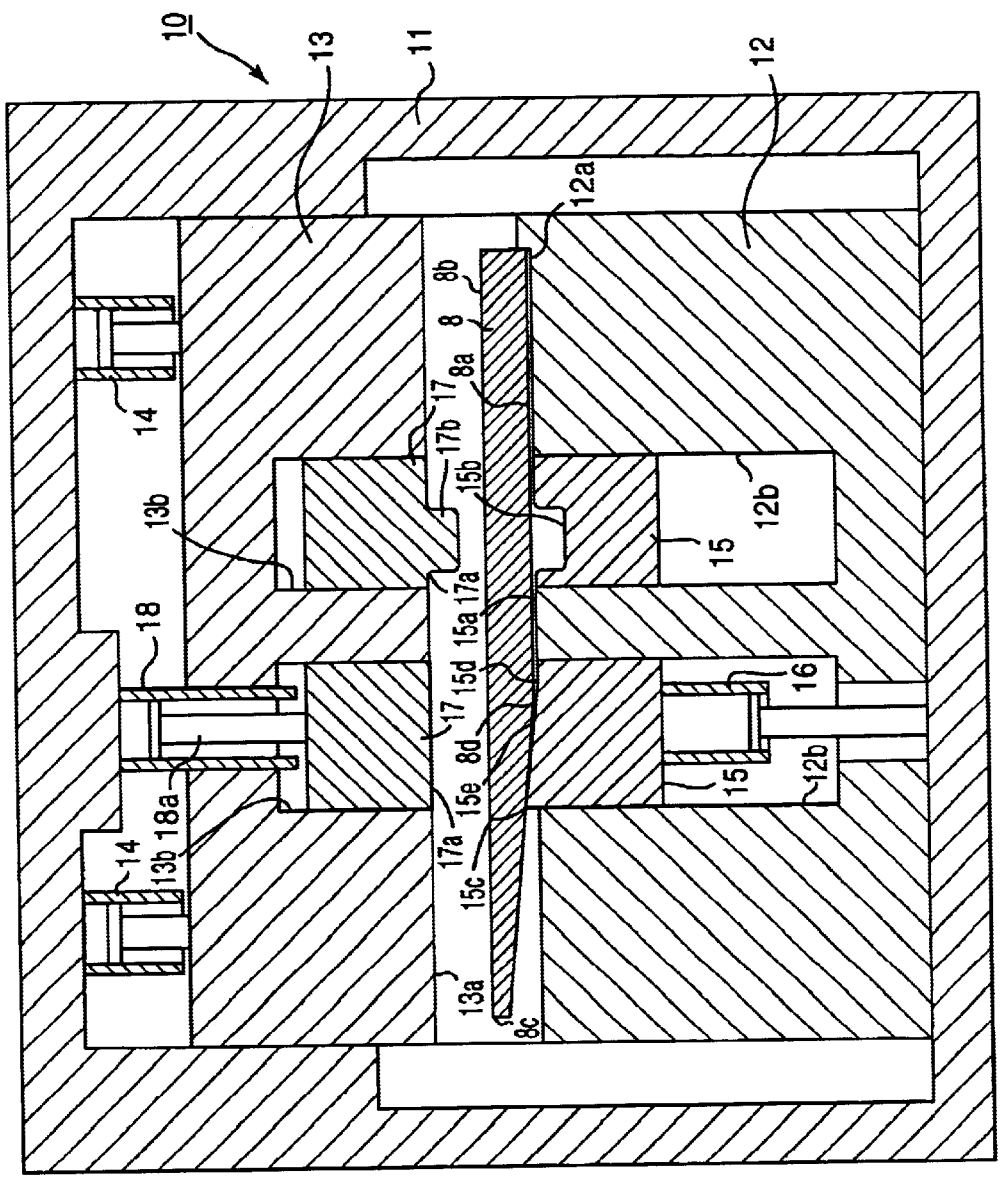
FIG. 10 is a sectional view of a punching apparatus according to the present invention showing a state when a V-block material is inserted.

This V-block material is punched with a punching apparatus 10 as shown in FIG. 10 to obtain the metal V-block 3. The punching apparatus 10 has a frame 11, a lower die 12 placed on a lower part of the frame 11, and an upper die 13 fitted in the frame 11 so as to approach and go away from the lower die 12. The upper die 13 is driven, up and down, by a die drive hydraulic cylinder 14 provided on an upper part of the frame An upper surface 12a of the lower die 12 is formed with a depression 12b of the same shape as (exactly, slightly larger than) the front shape of the metal V-block 3. In this depression 12b is closely fitted a counter punch 15 so as to slide up and down. Between the counter punch 15 and a bottom part of the frame 11 is inserted a counter punch drive hydraulic cylinder 16 to drive the counter punch 15 up and down.

A lower surface 13a of the upper die 13 is formed with a depression 13b of the same shape as the shape of the depression 12b of the lower die 12. In this depression 13b is closely fitted a punch 17 so as to slide, up and down. Between a top of the punch 17 and the frame 11 is inserted a punch drive hydraulic cylinder 18 with a piston 18a penetrating the upper die 13. The punch 17 is driven, up and down, by the punch drive hydraulic cylinder 18.

On an outer portion of an upper surface of the counter punch 15 is provided a short columnar hollow 15b for forming the projection 3d of the metal V-block 3, and on an outer portion of a lower surface 17a of the main punch 17 is provided a projection 17b for forming the short columnar hollow 3e of the metal V-block 3. On an inner portion of the upper surface 15a of the counter punch 15 is formed a slant 15e of about 3.5 degrees. The slant 15e begins at a place 15d distant from an inner edge 15c of the counter punch 15 by 4.2 mm and extends toward the inner edge 15c.

Figure 11:
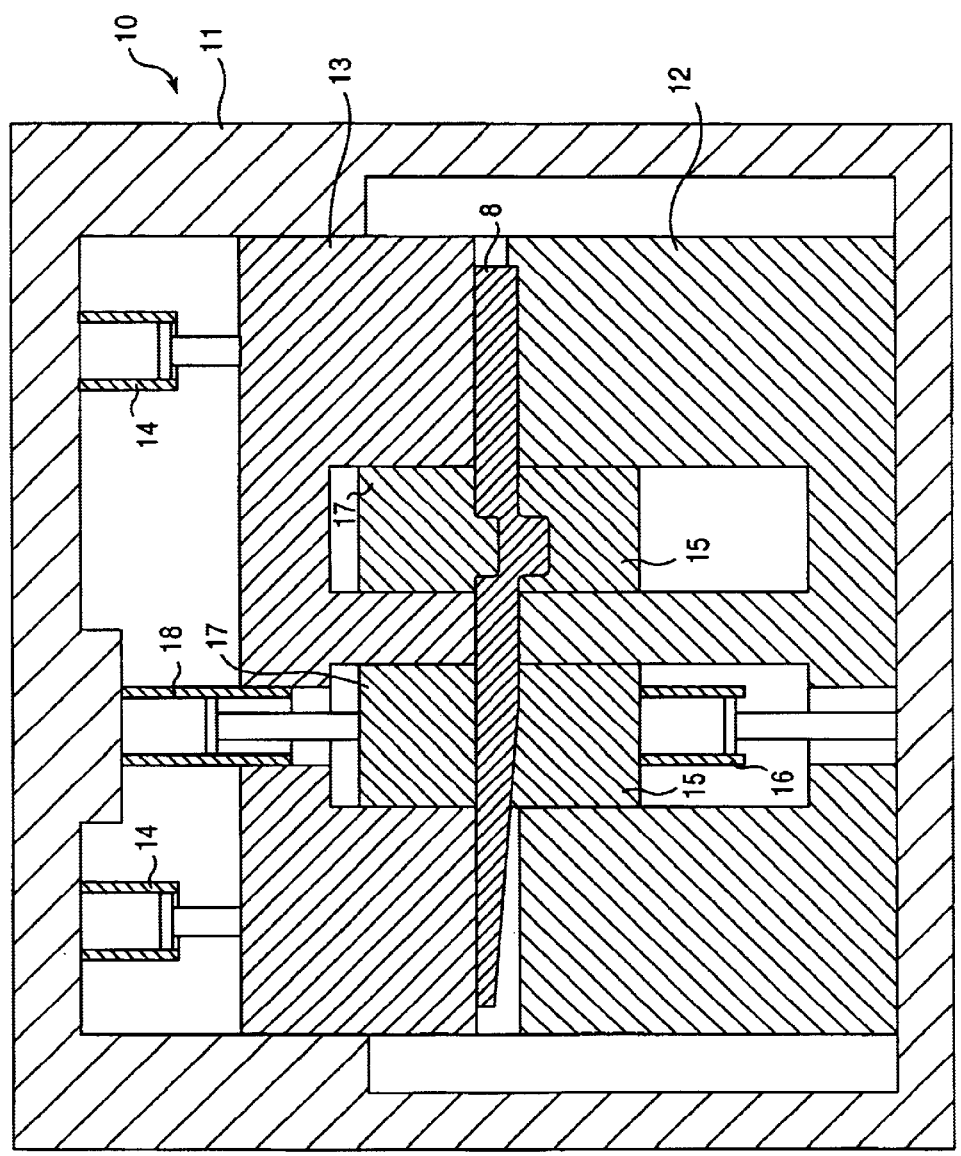
FIG. 11 is a sectional view similar to FIG. 10 showing a state when the V-block material is pinched by upper and lower dies, a main punch and a counter punch.
Figure 12:
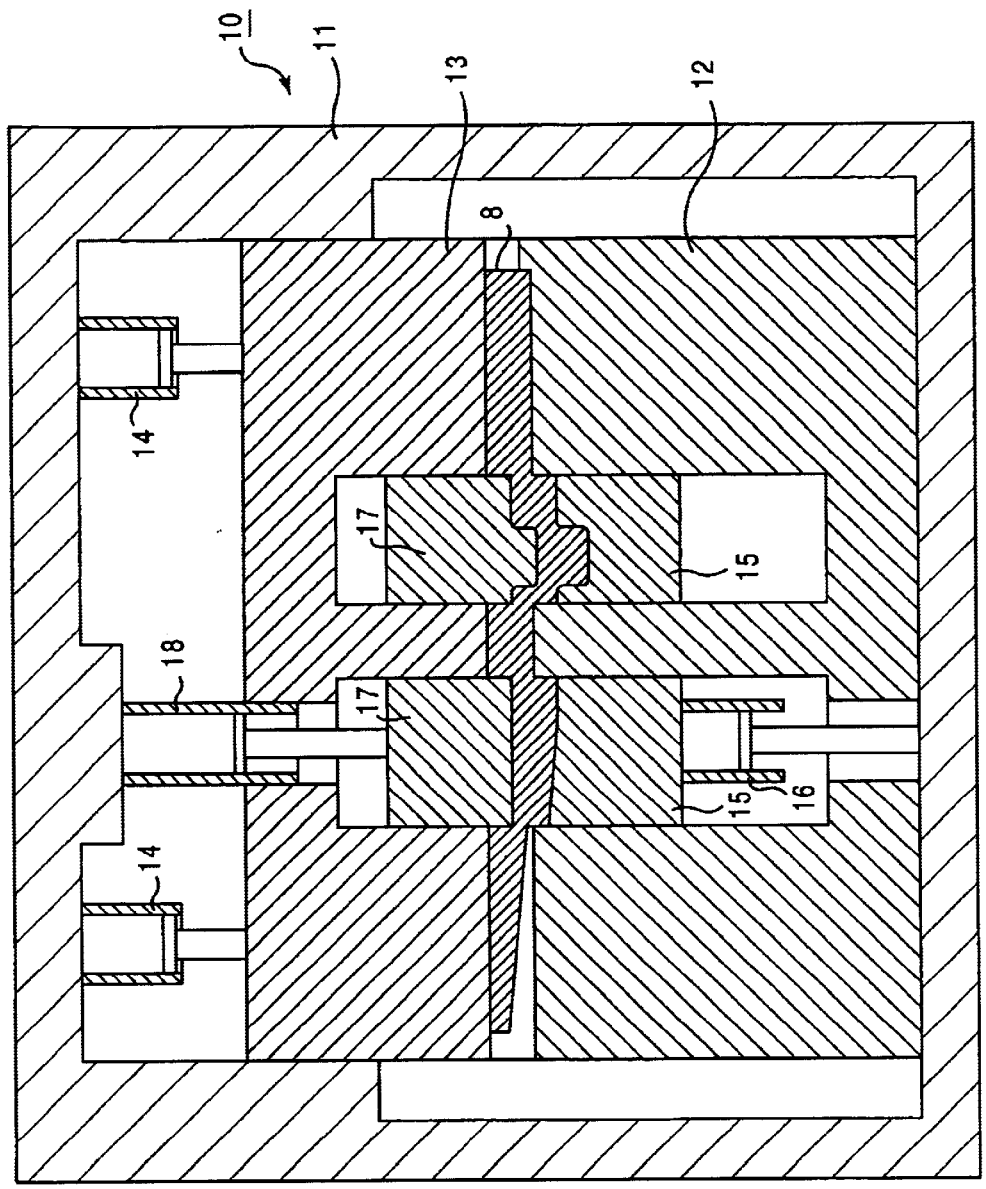
FIG. 12 is a sectional view similar to FIG. 10 showing an interim state of punching.
Figure 13:
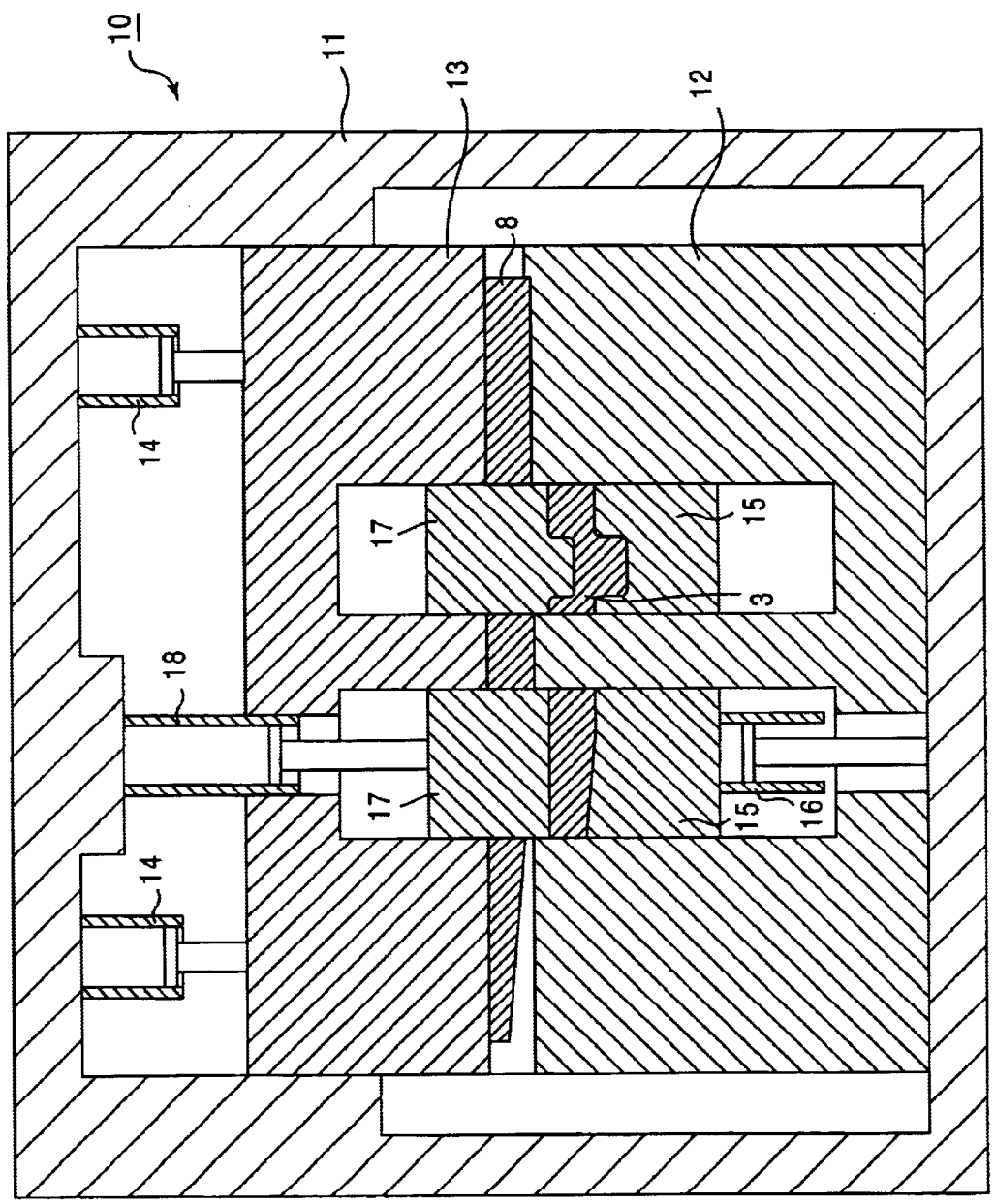
FIG. 13 is a sectional view similar to FIG. 12 showing a state when the punching is finished.

The v-block material 8 is placed on the lower die 12 and the counter punch 15 as shown in FIG. 10, and die drive hydraulic cylinder 14 and the main punch drive hydraulic cylinder 18 is operated to bring the lower surfaces 13a, 17a of the upper die 13 and the main punch 17 into contact with the surface 8b of the V-block material 8, then the V-block material is pinched by a constant pinching force by keeping oil pressure of the main punch drive hydraulic cylinder 18 and the counter punch drive hydraulic cylinder 16 at a predetermined pressure (FIG. 11). And, the main counter 17 and the counter punch 15 is lowered together to obtain a piece of the metal V-block 3 by the punch processing (FIG. 12).

After that, the die drive hydraulic cylinder 14, the counter punch drive hydraulic cylinder 16 and the main punch drive hydraulic cylinder 18 are returned to respective positions shown in FIG. 10, then the V-block material 8 is shifted in a direction of width of the metal V-block 3 (longitudinal direction of the V-block material 8) by 50 mm for example, beyond the width (24 mm) of the metal V-block 3, and then the aforementioned punch processing is repeated for mass production.

Figure 8A:
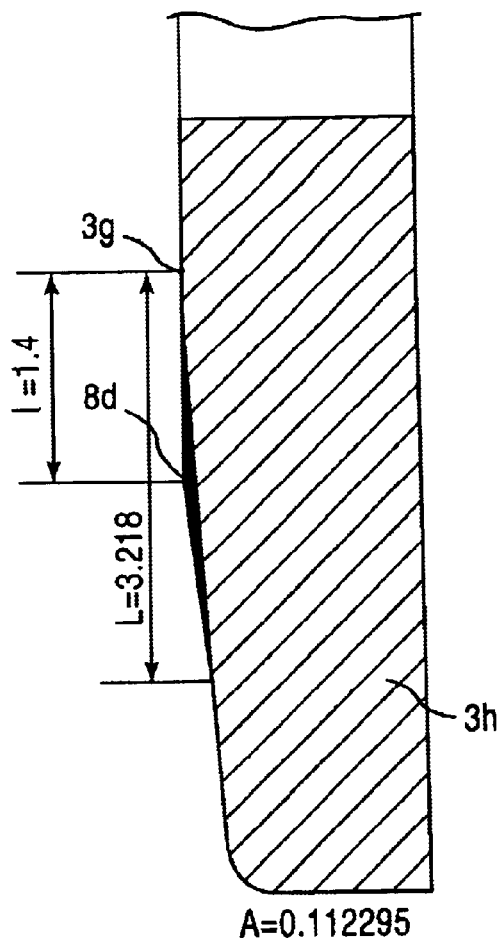
FIG. 8A is a sectional view of an inner portion of the V-block according to the present invention for showing state of press-crush.
Figure 8B:
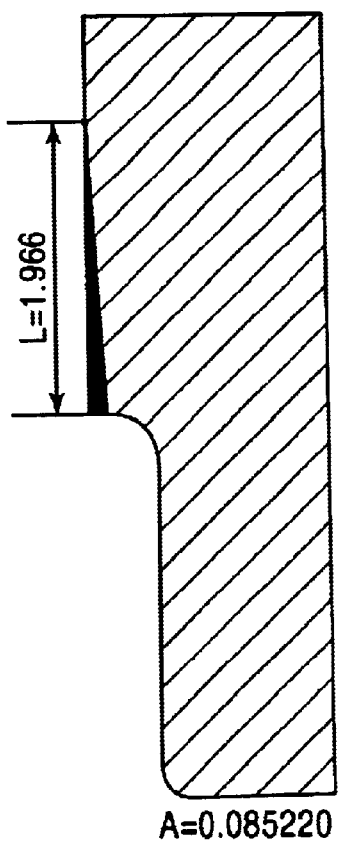
FIG. 8B is a sectional view of an inner portion of a customary V-block for showing state of press-crush.

As shown in FIG. 8a, the edge line 8d of the V-block material 8 and the rocking edge 3g, which is a slant beginning edge, of the metal V-block 3 are distant from each other by 1.4 mm, and a part of the V-block material 8 crushed by the upper surface of the counter punch 15, which is smeared black in FIG. 8A, has a shape of an isoceles triangle. Therefore, when the V-block material 8 is crushed, almost no reaction force is generated in a direction of width of the V-block material 8, that is, in a direction of height of the metal V-block 3, and when the V-block material 8 punched, the material 8 is not shifted in the direction of width of the V-block material 8 to keep gaps between the die and the main punch and between the die and the counter punch constant. As the result, accuracy of shape of the metal V-block 3 does not lowered and it is also prevented that a broken surface other than a shear surface is produced partly.

Figure 14:
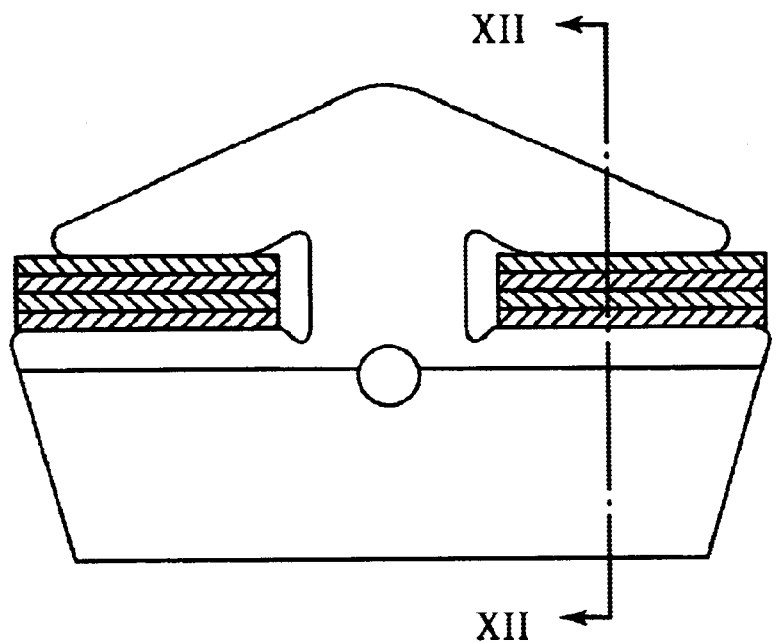
FIG. 14 is a front view of a V-block according to the present invention.
Figure 15:
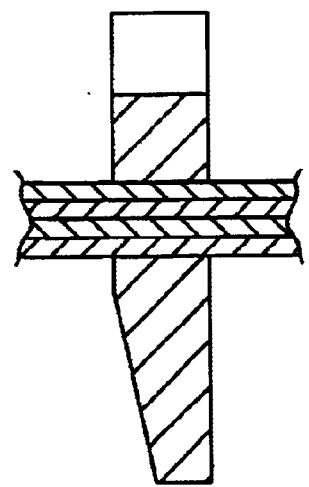
FIG. 15 is a sectional view taken along the line XV—XV of FIG. 14.
Figure 16:
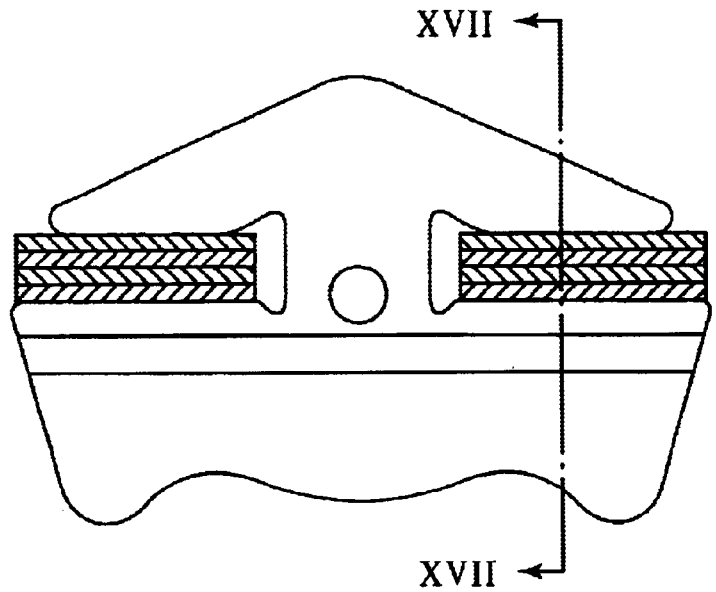
FIG. 16 is a front view of a customary V-block.
Figure 17:
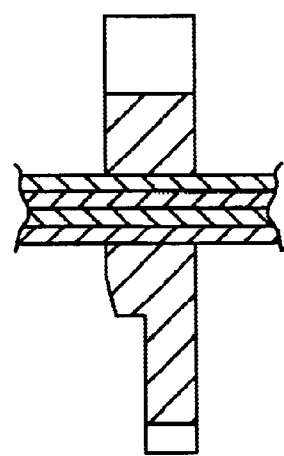
FIG. 17 is a sectional view taken along the line XVII—XVII of FIG. 16.

The crush sectional area A of the metal V-block 3 according to the present embodiment shown in FIGS. 14, 15 is 0.112295 mm$^2$, whereas the crush sectional area A of the V-block shown in FIGS. 16, 17 is 0.08522 mm$^2$. The crush length L of the metal V-block 3 shown in FIGS. 14, 15 is 3.218 mm, whereas the crush length L of the V-block shown in FIGS. 16, 17 is 1.966 mm. With respect to the mean crush depth A/L, as clear from the table of FIG. 19, that of the metal V-block 3 according to the present embodiment is lower than that of the customary V-block shown in FIGS. 16, 17. Therefore, according to the present invention, life of the punch is prolonged.

Figure 9A:
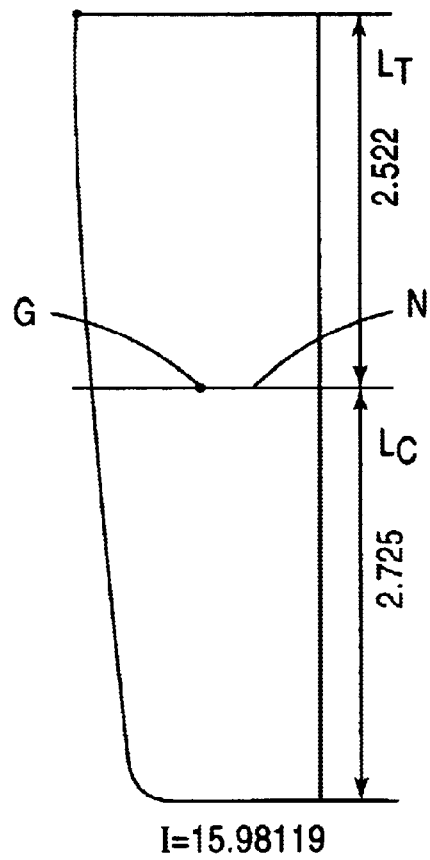
FIG. 9A is a side view of the V-block according to the present invention for showing a shape after forming and distances between a neutral axis and ends.
Figure 9B:
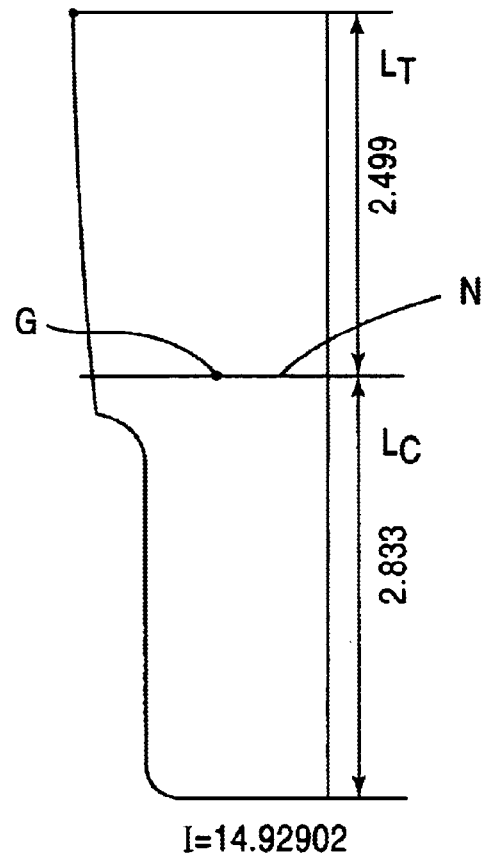
FIG. 9B is a side view of a customary V-block for showing a shape after forming and distances between a neutral axis and ends.

FIG. 9A shows the inner portion 3h of the metal V-block 3 shown in FIGS. 14, 15, and FIG. 9B shows similar inner portion of the customary v-block shown in FIGS. 16, 17. In the customary V-block, a portion near the innermost end is made thin compared with the metal V-block 3 of the present embodiment, and therefore moment of inertia of area I of the inner portion 3h with respect to a neutral axis N passing through the center of gravity G is smaller than similar I of the inner portion 3h of the metal V-block 3 of the present embodiment.

When bending moment M acts on the inner portion 3h of the metal V-block 3 pinched by pulley groove faces of the driven pulley 5 and the driven pulley 6 (see FIG. 3), tensile stress occurs at a place in the inner portion 3h neighboring the cut 3c and compressive stress occurs at the inner edge 3f. As clear from the table of FIG. 18, since the above-mentioned moment of inertia of area I in the present embodiment is larger than that of the customary V-block, the tensile stress $\acute{a}_T$ and the compressive stress $\acute{a}_c$ in the present embodiment is smaller than those of the customary V-block. Namely, when stress in the customary V-block is assumed to be 100, stress in the present embodiment is 90.71 (tensile stress) or 97.12 (compressive stress). Therefore, the metal V-block 3 of the present embodiment is hardly damaged and deformed.

What is claimed is:

1. A method for manufacturing a V-block of a metal belt type continuously variable transmission having an endless metal belt, said endless metal belt comprising a thin metal ring assembly formed by thin metal rings piled on each other stratified and a plurality of V-blocks supported by the thin metal ring assembly along its circumference, each of said V-blocks having a rocking edge defining a boundary between an outer portion thereof of substantially uniform thickness and a tapered inner portion thereof, said endless metal belt being wound round a drive pulley and a driven pulley for controlling speed change ratio by changing widths of grooves of the pulleys, wherein said method comprises:

forming each of said V-blocks by punching a V-block press material with a main punch and a counter punch;

wherein said V-block press material has a sectional view including an outer portion of about uniform thickness and a tapered inner portion with a slant gently inclined toward an innermost end away from said outer portion of the material from a place distant from a location to become said rocking edge by a predetermined distance inward;

wherein said main punch and said counter punch have front shapes of substantially same as that of said V-block; and wherein either punch facing said rocking edge has a slant starting at a place corresponding to said rocking edge and extending inward rising gradually away from said outer portion.

2. A method for manufacturing a V-block of a metal belt type continuously variable transmission as claimed in claim 1, wherein a first press-crush volume at a portion between a beginning point of the taper and said rocking edge of said V-block press material and a second press-crush volume at a region between said beginning point of the taper and said innermost end of the V-Block press material are substantially equal.

* * * * *